US008856742B2

(12) United States Patent
Branda et al.

(10) Patent No.: US 8,856,742 B2
(45) Date of Patent: Oct. 7, 2014

(54) DISTRIBUTED DEBUGGING

(75) Inventors: Steven J. Branda, Rochester, MN (US); William T. Newport, Rochester, MN (US); John J. Stecher, Rochester, MN (US); Robert Wisniewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/813,788

(22) Filed: Jun. 11, 2010

(65) Prior Publication Data

US 2011/0307871 A1 Dec. 15, 2011

(51) Int. Cl.
*G06F 9/44* (2006.01)
*G06F 11/36* (2006.01)

(52) U.S. Cl.
CPC ........ *G06F 11/3664* (2013.01); *G06F 11/3644* (2013.01)
USPC .......................................... 717/124; 717/129

(58) Field of Classification Search
None
See application file for complete search history.

(56) References Cited

U.S. PATENT DOCUMENTS

| | | | |
|---|---|---|---|
| 5,630,049 A * | 5/1997 | Cardoza et al. | 714/25 |
| 5,933,639 A * | 8/1999 | Meier et al. | 717/129 |
| 6,324,683 B1 * | 11/2001 | Fuh et al. | 717/124 |
| 6,637,024 B1 * | 10/2003 | Johnson et al. | 717/124 |
| 6,941,492 B1 * | 9/2005 | Ezra et al. | 714/38.13 |
| 6,986,124 B1 * | 1/2006 | Field et al. | 717/124 |
| 7,185,319 B2 * | 2/2007 | Kaler et al. | 717/124 |
| 7,765,526 B2 * | 7/2010 | Chen et al. | 717/124 |
| 8,171,346 B2 * | 5/2012 | Stairs et al. | 714/38.1 |
| 8,201,149 B1 * | 6/2012 | Gumtow et al. | 717/124 |
| 8,312,434 B2 * | 11/2012 | Bates et al. | 717/128 |
| 8,336,029 B1 * | 12/2012 | McFadden et al. | 717/124 |
| 8,453,120 B2 * | 5/2013 | Ceze et al. | 717/127 |

(Continued)

FOREIGN PATENT DOCUMENTS

| | | |
|---|---|---|
| CN | 101286883 A | 10/2008 |
| CN | 101727316 A | 6/2010 |

(Continued)

OTHER PUBLICATIONS

Translation of portions of office action that apply, discuss, or otherwise mention the following reference: Reference 3: Masakazu Yoshida, "Inside of Software Tool, Machine Level Debugger", Interface, Japan, CQ Publisher, vol. 17, No. 8, pp. 166-172, Aug. 1991.

*Primary Examiner* — Lewis A Bullock, Jr.
*Assistant Examiner* — Christine Dang
(74) *Attorney, Agent, or Firm* — Owen J. Gamon; Kevin D. Kehe

(57) ABSTRACT

In an embodiment, a first debug agent at a first computer receives a packet. The first debug agent adds a debug command and an identifier of the first debug agent to the packet and sends the packet to a receiving computer. A second debug agent at the receiving computer removes the debug command and the identifier of the first debug agent from the packet and sends the packet to a second program that executes at the receiving computer. The second debug agent further executes the debug command, which causes the second program that executes on the receiving computer to halt execution at a breakpoint or address watch memory location. The second debug agent sends the state of the second program to the first debug agent, which presents, at the first computer, the state and a listing of the second program.

15 Claims, 11 Drawing Sheets

(56) References Cited

U.S. PATENT DOCUMENTS

| | | |
|---|---|---|
| 2003/0233634 A1* | 12/2003 | Carrez et al. .................. 717/124 |
| 2004/0199629 A1 | 10/2004 | Borner |
| 2005/0060690 A1* | 3/2005 | Tung et al. .................... 717/129 |
| 2006/0129988 A1* | 6/2006 | Calsyn et al. ................. 717/124 |
| 2006/0277528 A1* | 12/2006 | Chen et al. .................... 717/124 |
| 2007/0079292 A1* | 4/2007 | Chen et al. .................... 717/127 |
| 2007/0113218 A1* | 5/2007 | Nolan et al. ................... 717/124 |
| 2007/0168994 A1 | 7/2007 | Barsness et al. |
| 2007/0168997 A1* | 7/2007 | Tran .............................. 717/129 |
| 2007/0266376 A1* | 11/2007 | Yim et al. ..................... 717/129 |
| 2009/0164981 A1* | 6/2009 | Heidasch et al. ............. 717/129 |
| 2009/0320002 A1* | 12/2009 | Peri-Glass et al. ........... 717/131 |
| 2011/0191752 A1* | 8/2011 | Cleraux et al. ............... 717/129 |

FOREIGN PATENT DOCUMENTS

| | | |
|---|---|---|
| CN | 102063368 A | 5/2011 |
| JP | 05282173 A | 10/1993 |
| JP | 08272644 A | 10/1996 |
| JP | 09319614 A | 12/1997 |

* cited by examiner

| | | | 158 |
|---|---|---|---|
| SAVED DEBUG DATA ||||
| 710 | 712 | 714 | |
| DEBUG COMMAND | CLIENT DEBUG AGENT ID | PROCESSING NODE ID | |
| SET BREAKPOINT WHEN PACKET RECEIVED BY PROGRAM | NODE E | NODE A, NODE B, NODE C | 702 |
| SET DISTRIBUTED ADDRESS WATCH ON ALL FIELDS OF OBJECT A | NODE E | ALL | 704 |

FIG. 7

DISTRIBUTED DEBUGGING

FIELD

An embodiment of the invention generally relates to computer systems and more particularly to debugging computer programs on distributed computer systems.

BACKGROUND

Computer systems typically comprise a combination of computer programs and hardware, such as semiconductors, transistors, chips, and circuit boards. The computer programs are stored in the storage devices and are executed by the processors. As the sophistication and complexity of computer programs increase, the programs become more difficult to debug. Bugs are problems, faults, or errors in a computer program. Locating, analyzing, and correcting suspected faults in a computer program is a process known as "debugging." Typically, a programmer uses another computer program commonly known as a "debugger" to debug the program under development.

Conventional debuggers typically support three primary types of operations, which a computer programmer may request via a user interface. A first type is a breakpoint or address watch operation, which permits a programmer to identify with a breakpoint a precise instruction at which to halt execution of the program by the processor, or identify via an address watch, a memory location for the processor to monitor for content modification, at which time the program's execution is halted. As a result, when a program is executed by the debugger, the program executes on the processor in a normal fashion until the breakpoint is reached or the contents of the monitored memory location are written to, at which time the debugger halts execution of the program. A second type is a step operation, which permits a computer programmer to cause the processor to execute instructions in a program either one-by-one or in groups. After each instruction or group of instructions are executed, the debugger then halts execution of the program. Once the execution of the program is halted, either by step or breakpoint operations, conventional debuggers provide a third type of operation, which displays the content that is stored at various storage locations, in response to requests by the programmer. By this debugging process of halting the program at various instructions and examining the content of various storage locations, the programmer might eventually find the storage location whose stored content, such as an instruction or data, is incorrect or unexpected.

SUMMARY

A method, computer-readable storage medium, and distributed debug system are provided. In an embodiment, a first debug agent at a first computer receives a packet from a first program. The first debug agent adds a debug command and an identifier of the first debug agent to the packet and sends the packet to a receiving computer. A second debug agent at the receiving computer removes the debug command and the identifier of the first debug agent from the packet and sends the packet to a second program that executes at the receiving computer. The second debug agent further executes the debug command, which causes the second program that executes on the receiving computer to halt execution at a breakpoint or halt when the address watch memory location is updated. The second debug agent sends the state of the second program to the first debug agent, which presents, at the first computer, the state and a listing of the second program.

BRIEF DESCRIPTION OF THE SEVERAL VIEWS OF THE DRAWINGS

FIG. 7 depicts a block diagram of example saved debug data, according to an embodiment of the invention.

It is to be noted, however, that the appended drawings illustrate only example embodiments of the invention, and are therefore not considered a limitation of its scope, for the invention may admit to other equally effective embodiments.

DETAILED DESCRIPTION

Figure 1:
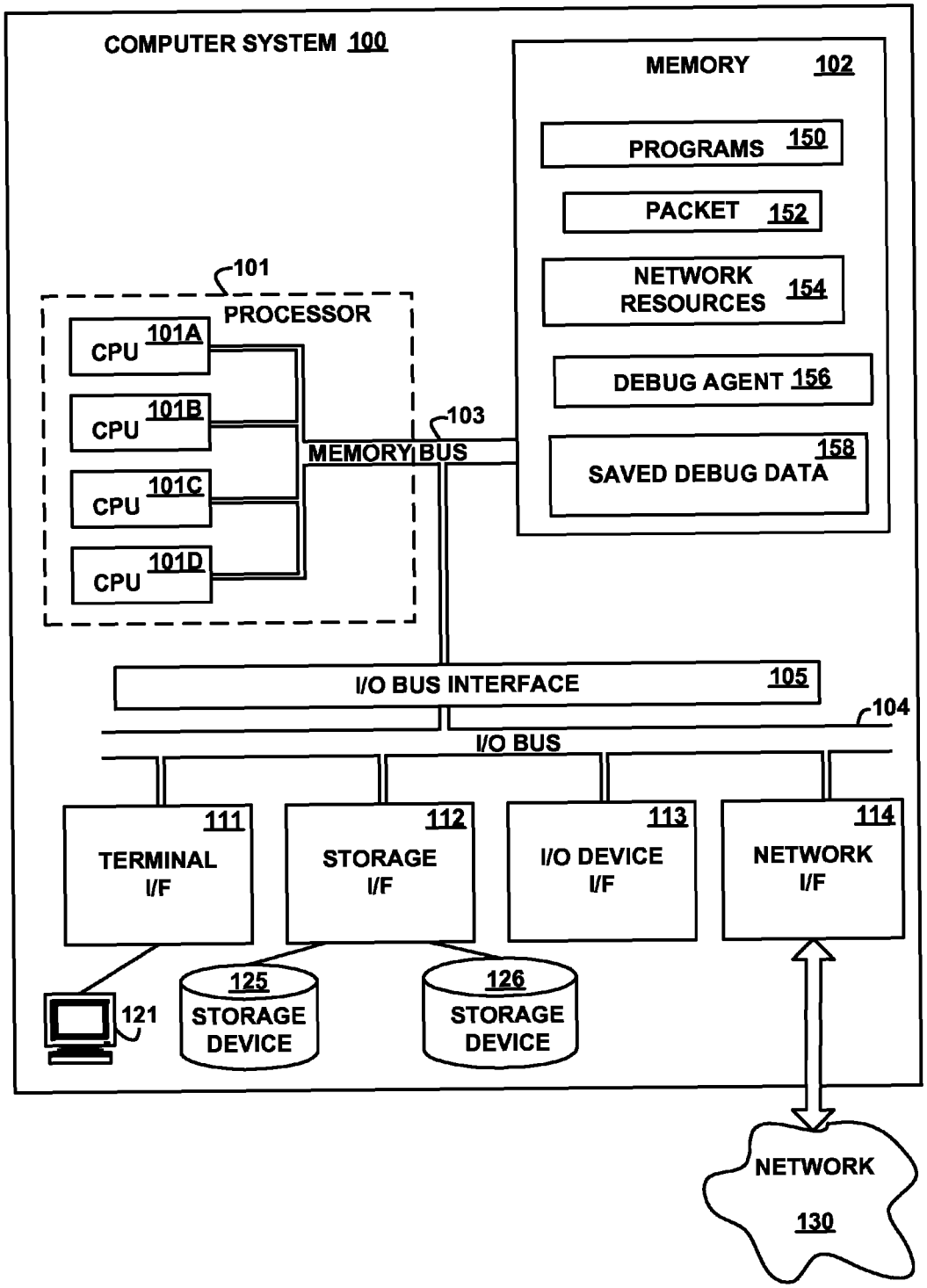
FIG. 1 depicts a high-level block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory, storage device, or storage medium for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes programs 150, a packet 152, network resources 154, a debug agent 156, and saved debug data 158. Although the programs 150, the packet 152, the network resources 154, the debug agent 156, and the saved debug data 158 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the programs 150, the packet 152, the network resources 154, the debug agent 156, and the saved debug data 158 are illustrated as being contained within the main memory 102, these elements are not necessarily all completely contained in the same storage device at the same time. Further, although the programs 150, the packet 152, the network resources 154, the debug agent 156, and the saved debug data 158 are illustrated as being separate entities, in other embodiments some of them, portions of some of them, or all of them may be packaged together.

The programs 150 comprise code that executes on the processor 101 of the computer system 100 and copies of programs that execute on other computer systems that are connected to the computer system 100 via the network 130. The program 150 is a program being debugged via the debug agent 156. The program 150 may be any type of executable or interpretable code or statements, whether in source or object form. In various embodiments, the program 150 may be an application program, an operating system program, a network application, an application server, a server program, a grid program, a scientific calculation manager, a query optimizer, or any other type of program.

The packet 152 comprises data, which the programs 150 read/write and send/receive to other computer systems via the network 130. In various embodiments, the packet 152 may comprise data, a database, objects, classes, code, a file, a hierarchy of directories, subdirectories, and files, a data structure, or any other type of data or information repository.

The network resources 154 manage the sending and receiving of packets 152 via the network 130. In various embodiments, the network resources 154 comprise a socket, an API (Application Programming Interface), an object request broker, or a configuration file. In another embodiment, the network resources 154 comprise a program, module, method, class, or object that comprises units of instructions or statements that execute on the computer system 100.

The debug agent 156 manages breakpoints and address watches in the programs 150 in response to receiving a debug command, which may be issued on a command line, entered through a graphical user interface, or issued via an application. A breakpoint is a statement or instruction within the programs 150 at which the user desires to halt execution of the programs 150. An address watch monitors a memory location (such as an address, field, object, record, or file) and halts execution of the program 150 in response to the program 150 modifying, updating, or writing to the contents of that memory location. As a result, when the programs 150 are executed by the debug agent 156, the programs 150 execute on the processor 101 in a normal fashion until the breakpoint is reached or the monitored memory location is modified. The debug agent 156 then stops execution of the program 150 at the breakpoint instruction or the instruction that modified the memory location and displays the results and/or state of the program 150 and/or the state of the computer system 100 to the user for analysis, on a debugger user interface via the user input/output device 121.

The debug agent 156 sets breakpoints in the program 150, e.g., by replacing a valid statement or instruction at a breakpoint location in the program 150 with an invalid instruction and by creating a record for the breakpoint in a breakpoint table. The debug agent 156 initiates an address watch via a function of the processor 101, which monitors a memory location specified by the debug agent 156. After the breakpoints and/or the address watch are set, the user provides an input to a debug user interface that resumes execution of the program 150. In response to the execution of the program 150 eventually encountering the invalid statement or instruction or the contents of the monitored memory location eventually being modified, a system exception or interrupt occurs, which halts execution of the program 150 and gives control of the processor 101 to the debug agent 156. The debug agent 156 then gives control to the user via a debug user interface, and the user may then issue commands to the debug agent 156 via the user interface, which the debug agent 156 interprets to find and display the statements or instructions that define the content of an input storage location, to display the contents of storage locations, to set or remove breakpoints or address watch functions, to resume execution of the program 150, or any other appropriate operations.

The saved debug data 158 comprises data that the debug agent 156 has saved. The saved debug data 158 is further described below with reference to FIG. 7. The debug agent 156 uses the saved debug data 158 to implement distributed debugging, as further described below with reference to FIGS. 8, 9, 10, 11, 12, 13, and 14.

In an embodiment, one, some, or all of the programs 150, the network resources 154, and the debug agent 156 include instructions or statements that execute on the processor 101 or instructions or statements that are interpreted by instructions or statements that execute on the processor 101, to carry out the functions as further described below with reference to FIGS. 8, 9, 10, 11, 12, 13, and 14. In an embodiment, one, some, or all of the programs 150, the network resources 154, and the debug agent 156 are implemented in hardware via semiconductor devices, chips, logical gates, circuits, circuit cards, and/or other physical hardware devices in lieu of, or in addition to, a processor-based system.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more direct access storage devices (DASD) 125 and 126 (which are typically rotating magnetic disk drive storage devices, although they could alternatively be other devices, including arrays of disk drives configured to appear as a single large storage device to a host). In another embodiment, the devices 125 and/or 126 may be implemented via any type of secondary storage device. The contents of the main memory 102, or any portion thereof, may be stored to and retrieved from the direct access storage devices 125 and 126, as needed.

The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user "mainframe" computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network, cell-based radio network. In still another embodiment, the network 130 may be any suitable network or combination of networks. Although one network 130 is shown, in other embodiments any number of networks (of the same or different types) may be present.

It should be understood that FIG. 1 is intended to depict the representative major components of the computer system 100, and the network 130 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention.

As will be appreciated by one skilled in the art, aspects of embodiments of the present invention may be embodied as a system, method, or computer program product. Accordingly, aspects of embodiments of the present invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Furthermore, embodiments of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device.

Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors.

The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one ore more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
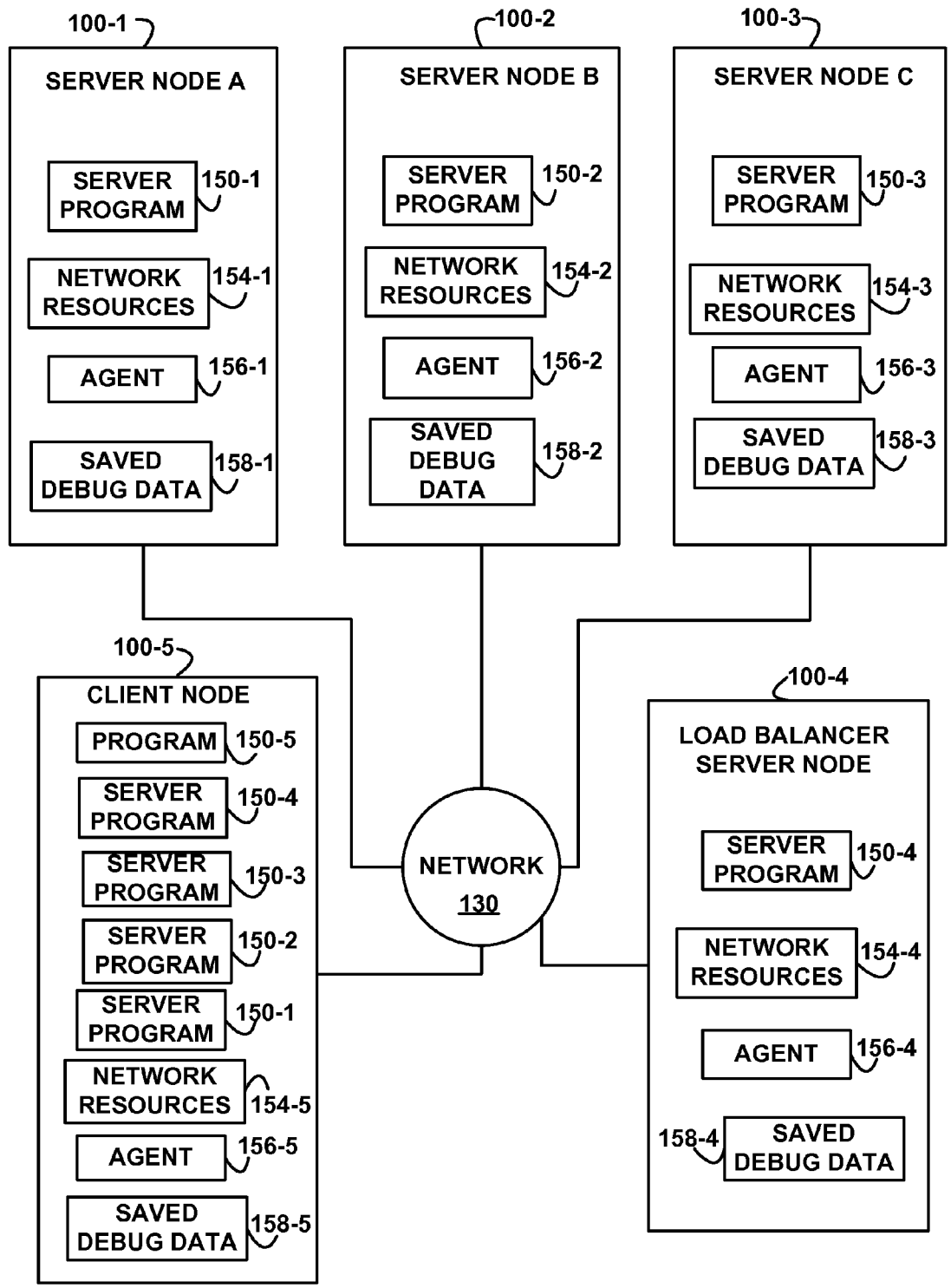
FIG. 2 depicts a block diagram illustrating selected components of a distributed debug system, according to an embodiment of the invention.

FIG. 2 depicts a block diagram illustrating selected components of a distributed debug system, according to an embodiment of the invention. The distributed debug system comprises server computer system nodes 100-1, 100-2, and 100-3, a load balancer computer system server node 100-4, and a client computer system node 100-5, which are connected via the network 130. The computer system nodes 100-1, 100-2, 100-3, 100-4, and 100-5 are examples of and are generically referred to by the computer system 100 (FIG. 1). Although the client computer system node 100-5 is illustrated as being connected to the server computer system nodes 100-1, 100-2, and 100-3 via the network 130, in another embodiment, the client computer system node 100-5 is connected to the load balancer server node 100-4 via the network 130 and is communicatively connected to the server computer system nodes 100-1, 100-2, and 100-3 via the load balancer server node 100-4.

The server computer system node 100-1 comprises a server program 150-1, network resources 154-1, a debug agent 156-1, and saved debug data 158-1. The server computer system node 100-2 comprises a server program 150-2, network resources 154-2, a debug agent 156-2, and saved debug data 158-2. The server computer system node 100-3 comprises a server program 150-3, network resources 154-3, a debug agent 156-3, and saved debug data 158-3. The load balancer computer system server node 100-4 comprises a server program 150-4, network resources 154-4, a debug agent 156-4, and saved debug data 158-4. The client computer system node 100-5 comprises a program 150-5, server programs 150-1, 150-2, 150-3, and 150-4, network resources 154-5, a debug agent 156-5, and saved debug data 158-5. The programs 150-1, 150-2, 150-3, 150-4, and 150-5 are examples of, and are generically referred to by, the programs 150 (FIG. 1). The network resources 154-1, 154-2, 154-3, 154-4, and 154-5 are examples of, and are generically referred to by, the network resources 154 (FIG. 1). The debug agents 156-1, 156-2, 156-3, 156-4, and 156-5 are examples of, and are generically referred to by, the debug agent 156 (FIG. 1). The saved debug data 158-1, 158-2, 158-3, 158-4, and 158-5 are examples of, and are generically referred to by, the saved debug data 158 (FIG. 1).

The programs 150-1, 150-2, 150-3, 150-4, and 150-5 comprise the instructions that the debug agents 156-1, 156-2, 156-3, 156-4, and 156-5 debug. In an embodiment, all of the programs 150-1, 150-2, 150-3, 150-4, and 150-5 are identical. In another embodiment, some or all of the programs 150-1, 150-2, 150-3, 150-4, and 150-5 are different from each other.

The program 150-5 in the client computer system node 100-5 comprises code that executes on a processor at the client computer system node 100-5. The server programs 150-1, 150-2, 150-3, and 150-4 in the client computer system node 100-5 are copies of the server programs 150-1, 150-2, 150-3, and 150-4 at the server computer system nodes 100-1, 100-2, and 100-3 and the load balancer computer system node 100-4, respectively. The server programs 150-1, 150-2, 150-3, and 150-4 do not execute at the client computer system node 100-5. Instead, the client computer system node 100-5 may display the program listings of one or more of the server programs 150-1, 150-2, 150-3, and 150-4 and their state information, in order to aid in debugging, as further described below with reference to FIG. 6, in addition to displaying the program listings of the program 150-5 and its state information. Program listings include the source code and/or compiled object code instructions or statements that are included in the program. The program listing may also include instruction or statement numbers that identify the instructions or statements and the order of the instructions or statements within the listing.

The load balancer computer system node 100-4 receives requests or packets 152 of data from the client computer system node 100-5 and distributes them for processing to the server computer system nodes 100-1, 100-2, and 100-3. The use of the terms "client," and "server" are for convenience, and a computer system node that acts as a client in one scenario may act as a server in another scenario, and vice versa.

In an embodiment, a user interacts with the debug agent 156-5 via the user input/output device 121 (FIG. 1) to debug the programs 150-1, 150-2, 150-3, 150-4, and/or 150-5.

While the program 150-5 is halted, the user requests, via a debug command entered via the input/output device 121, that the debug agent 156-5 set a breakpoint at an instruction in one or more of the server programs 150-1, 150-2, 150-3 and/or 150-4 that execute on the server nodes 100-1, 100-2, 100-3, and/or 100-4, or establish an address watch on the contents of an address in the memory of the server nodes 100-1, 100-2, 100-3, and/or 100-4. The debug agent 156-5 saves the debug command in the saved debug data 158-5. The user then requests, via the user input/output device 121 (FIG. 1), that the debug agent 156 start the program 150-5 executing on the client 100-5. The program 150-5 executes and creates a packet 152 of data and/or command(s) for sending to the load balancer 100-4. The debug agent 156-5 intercepts the packet 152, adds the saved debug command and identifier of the debug agent 156-5 to the packet 152, and sends the packet 152 to the load balancer 100-4, which sends the packet 152 to one or more of the servers 100-1, 100-2, or 100-3, where the packet is processed, handled, or executed.

The debug agent 156-1, 156-2, 156-3, or 156-4 at the respective server 100-1, 100-2, 100-3, or 100-4 intercepts or receives the packet 152 from the respective network resources 154-1, 154-2, 154-3, or 154-4, removes or deletes the debug command and identifier of the debug agent 156-5 from the packet 152, saves the debug command and identifier of the debug agent 156-5 in the respective saved debug data 158-1, 158-2, 158-3, or 158-4, sets the requested breakpoint or address watch in the respective server program 150-1, 150-2, 150-3, or 150-4 that executes at the respective computer node 100-1, 100-2, 100-3, or 100-4, respectively, and then forwards the packet 152 to the respective server program 150-1, 150-2, 150-3, or 150-4.

In response to the execution of the server program 150-1, 150-2, 150-3, or 150-4 encountering the instruction at which the breakpoint is set or that modifies the contents of the memory location monitored by an address watch, the debug agent 156-1, 156-2, 156-3, or 156-4 halts execution of the server program 150-1, 150-2, 150-3, or 150-4, finds the identifier of the debug agent 156-5 in the saved debug data 158-1, 158-2, 158-3, or 158-4, and sends the state of the halted server program 150-1, 150-2, 150-3, or 150-4 to the debug agent 156-5. The debug agent 156-5 finds the copy of the server program 150-1, 150-2, 150-3, or 150-4 at the client computer system node 100-5 that encountered the breakpoint while executing at the computer system nodes 100-1, 100-2, 100-3, or 100-4 and presents or displays the copy of the server program 150-1, 150-2, 150-3, or 150-4 at the client computer system node 100-5 with the state information.

Figure 3:
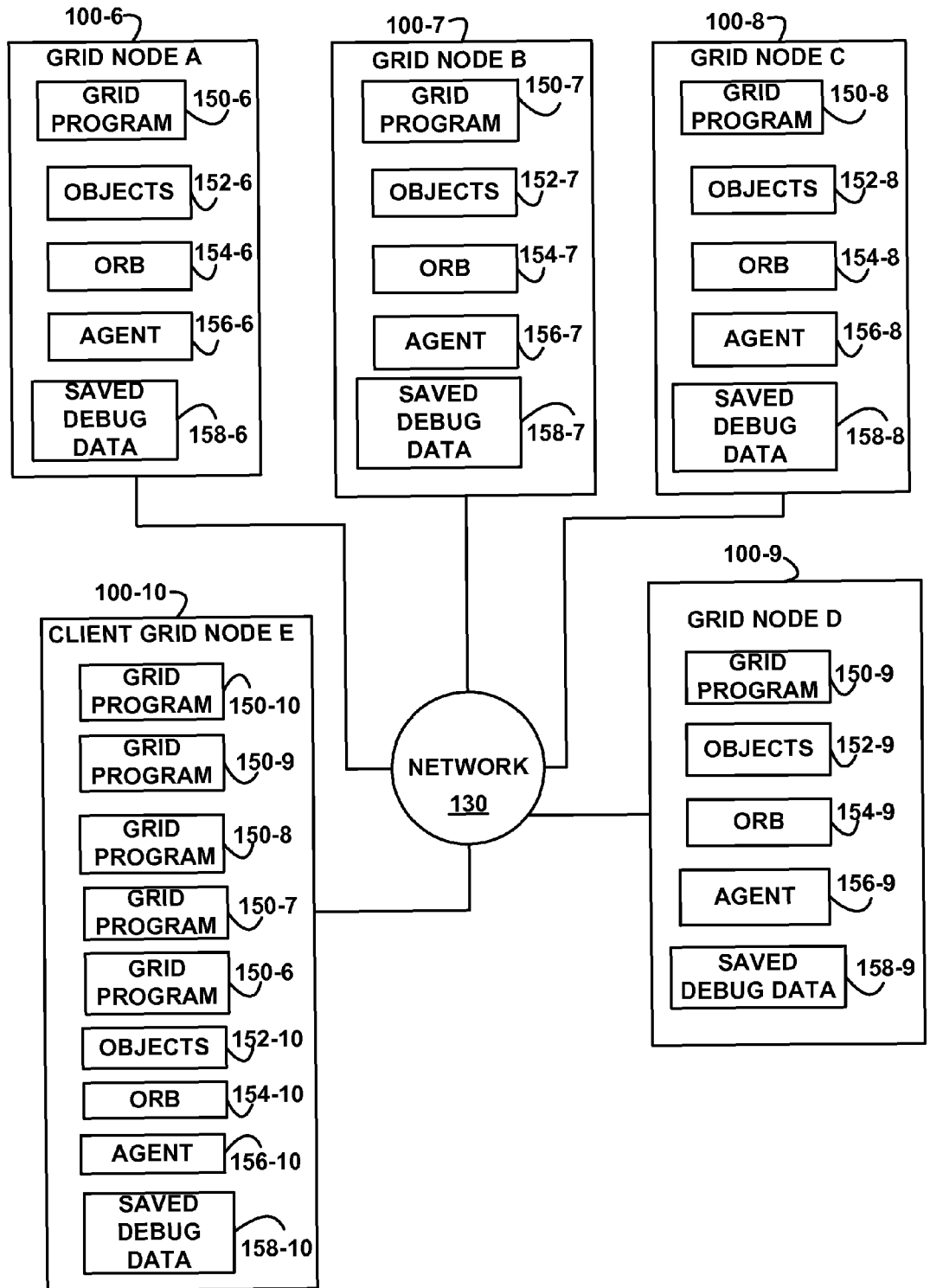
FIG. 3 depicts a block diagram illustrating selected components of another distributed debug system, according to an embodiment of the invention.

FIG. 3 depicts a block diagram illustrating selected components of a distributed debug system, according to an embodiment of the invention. The example distributed debug system of FIG. 3 comprises the grid computer system nodes 100-6, 100-7, 100-8, 100-9, and 100-10 connected via the network 130. The grid computer system nodes 100-6, 100-7, 100-8, 100-9, and 100-10 are examples of, and are generically referred to by, the computer system 100 (FIG. 1).

The grid computer system node 100-6 comprises a grid program 150-6, objects 152-6, an object request broker 154-6, a debug agent 156-6, and saved debug data 158-6. The grid computer system node 100-7 comprises a grid program 150-7, objects 152-7, an object request broker 154-7, a debug agent 156-7, and saved debug data 158-7. The grid computer system node 100-8 comprises a grid program 150-8, objects 152-8, an object request broker 154-8, a debug agent 156-8, and saved debug data 158-8. The grid computer system node 100-9 comprises a grid program 150-9, objects 152-9, an object request broker 154-9, a debug agent 156-9, and saved debug data 158-9. The client computer system node 100-10 comprises grid programs 150-6, 150-7, 150-8, 150-9, and 150-10, objects 152-10, an object request broker 154-10, a debug agent 156-10, and saved debug data 158-10.

The grid programs 150-6, 150-7, 150-8, 150-9, and 150-10 are examples of, and are generically referred to by, the grid programs 150 (FIG. 1). The objects 152-6, 152-7, 152-8, 152-9, and 152-10 are examples of, and are generically referred to, by the packet 152 (FIG. 1). The object request brokers 154-6, 154-7, 154-8, 154-9, and 154-10 are examples of, and are generically referred to by, the network resources 154 (FIG. 1). The debug agents 156-6, 156-7, 156-8, 156-9, and 156-10 are examples of, and are generically referred to by, the debug agent 156 (FIG. 1). The saved debug data 158-6, 158-7, 158-8, 158-9, and 158-10 are examples of, and are generically referred to by, the saved debug data 158 (FIG. 1).

The grid programs 150-6, 150-7, 150-8, 150-9, and 150-10 comprise the instructions that the debug agents 156-6, 156-7, 156-8, 156-9, and 156-10 debug. In an embodiment, all of the grid programs 150-6, 150-7, 150-8, 150-9, and 150-10 are identical. In another embodiment, some or all of the grid programs 150-6, 150-7, 150-8, 150-9, and 150-10 are different from each other.

The grid program 150-10 in the client computer system node 100-10 comprises code that executes on a processor at the client computer system node 100-10. The grid programs 150-6, 150-7, 150-8, and 150-9 in the client computer system node 100-10 are copies of the grid programs 150-6, 150-7, 150-8, and 150-9 at the grid computer system nodes 100-6, 100-7, and 100-8 and the grid computer system node 100-9, respectively. The grid programs 150-6, 150-7, 150-8, and 150-9 do not execute at the client computer system node 100-10. Instead, the client computer system node 100-10 may display the program listings of one or more of the grid programs 150-6, 150-7, 150-8, and 150-9 and their state information, in order to aid in debugging, as further described below with reference to FIG. 6, in addition to displaying the program listings of the grid program 150-10 and its state information. The term "client" is used only for convenience, and a grid computer system node that acts as a client in one scenario may act as a server in another scenario, and vice versa.

The object request brokers 154-6, 154-7, 154-8, 154-9, and/or 154-10 may send the objects 152 to various of the grid computer system nodes 100-6, 100-7, 100-8, 100-9, and/or 100-10 for processing by the various grid programs 150-6, 150-7, 150-8, 150-9, and/or 150-10. The objects may travel between the grid computer system nodes any number of times.

In an embodiment, a user interacts with the debug agent 156-10 via the user input/output device 121 (FIG. 1) to debug the grid programs 150-6, 150-7, 150-8, 150-9, and/or 150-10. While execution of the grid program 150-10 is halted, the user requests, via a debug command entered via the input/output device 121 (FIG. 1), that the debug agent 156-10 set a distributed address watch on the object 152-10 or on any field or fields in the object 152-10. The debug agent 156-10 saves the debug command in the saved debug data 158-10. The user then requests, via the via the user input/output device 121 (FIG. 1), that the debug agent 156-10 start the grid program 150-10 executing on the client 100-10. The grid program 150-10 executes and creates the object 152-10 for sending to the grid computer system node 100-6, 100-7, 100-8, and/or 100-9 via the object request broker 154-10. The debug agent 156-10 intercepts the object 152-10, adds the saved debug command and identifier of the debug agent 156-10 to the object 152-10, and sends the object 152-10 to the grid computer system node 100-6, 100-7, 100-8, and/or 100-9.

The debug agent 156-6, 156-7, 156-8, or 156-9 at the grid computer system node 100-6, 100-7, 100-8, or 100-9 intercepts the object 152-10 via the object request broker 154-6, 154-7, 154-8, or 154-9, removes the debug command and identifier of the debug agent 156-10 from the object 152-10, saves the debug command and identifier of the debug agent 156-10 in the saved debug data 158-6, 158-7, 158-8, or 158-9, sets the distributed address watch on the object 152-10, and then forwards the object 152-10 to the grid program 150-6, 150-7, 150-8, or 150-9 for processing.

In response to the execution of the grid program 150-6, 150-7, 150-8, or 150-9 modifying the object 152-10 or a field or fields in the object 152-10, the debug agent 156-6, 156-7, 156-8, or 156-9 halts execution of the grid program 150-6, 150-7, 150-8, or 150-9, finds the identifier of the debut agent 156-10 in the saved debug data 158-6, 158-7, 158-8, or 158-9, and sends the state of the halted grid program 150-6, 150-7, 150-8, or 150-9 to the debug agent 156-10. The debug agent 156-10 finds the copy of the grid program 150-6, 150-7, 150-8, or 150-9 that modified the object 152-10 while executing at the computer system nodes 100-6, 100-7, 100-8, or 100-9 and displays the copy of the grid program 150-6, 150-7, 150-8, or 150-9 with the state information.

Figure 4:
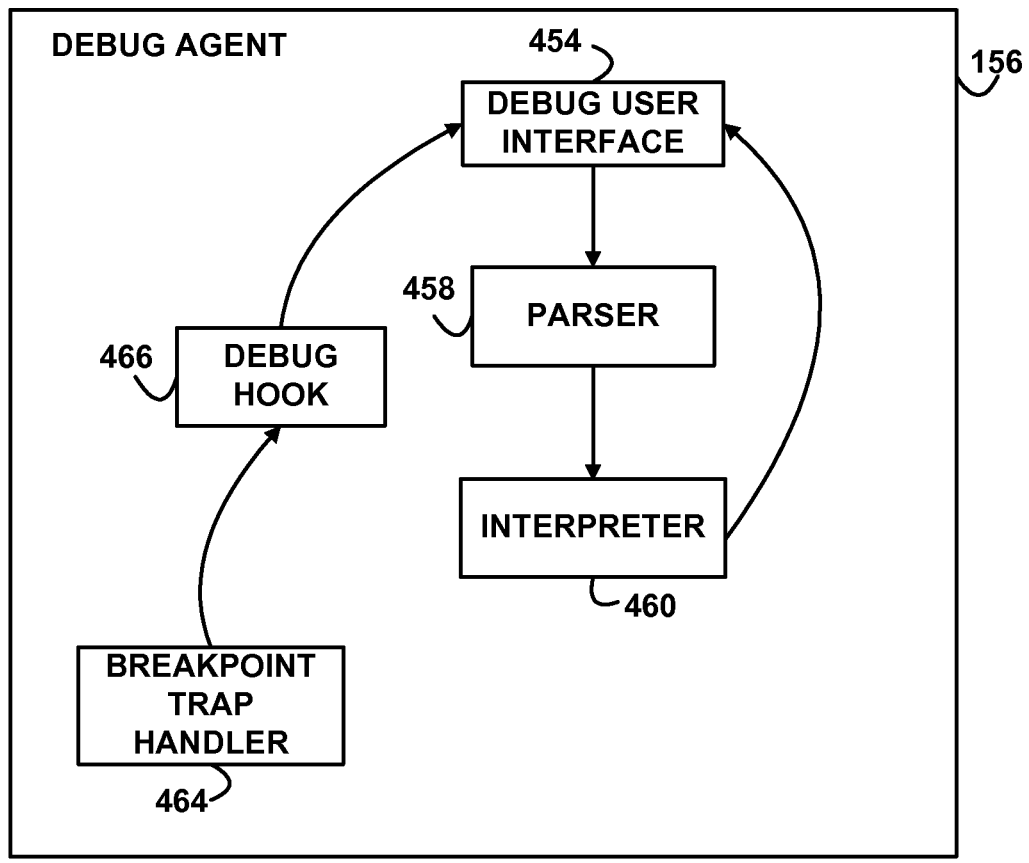
FIG. 4 depicts a block diagram illustrating the interaction of selected components of an embodiment of the invention.

FIG. 4 depicts a block diagram illustrating the interaction of selected components of an embodiment of the invention. The debug agent 156 includes a debug user interface 454, a parser 458, an interpreter 460, a breakpoint trap handler 464, and a debug hook 466. The debug user interface 454, the parser 458, the interpreter 460, the breakpoint trap handler 464, and the debug hook 466 comprise instructions that execute on the processor 101 or statements that are interpreted by instructions that execute on the processor. In another embodiment, the debug user interface 454, the parser 458, the interpreter 460, the breakpoint trap handler 464, and the debug hook 466 are implemented in hardware via electronic circuits, logic gates, and/or chips in lieu of or in addition to a processor-based system.

The debug user interface 454 provides breakpoints and address watches to be established by interacting with a user via the user input/output device 121. In some embodiments, the user may define these breakpoints by issuing a debugger command that refers to high-level language (HLL) references in the programs 150 (FIG. 1), such as line or statement numbers or software object references such as a program or module name, from which the physical storage address may be cross referenced. In various embodiments, the debugger command may be issued on a command line or through a graphical user interface.

The parser 458 parses debug commands from the debug user interface 454 to create code, which the interpreter 460 interprets for execution on the processor 101. The parser 458 parses debug commands using a table that was produced by a compiler or interpreter stored with the programs 150 to map code line numbers, code statement numbers, variables names, object names, or field names in debugger commands to the actual physical storage address in the memory 102. The interpreter 160 stores the physical storage addresses in memory, such as in a breakpoint table. The interpreter 460 further runs a program to set breakpoints in the programs 150 and to establish address watches via processor functions. In an embodiment, the interpreter 460 sets breakpoints at breakpoint instructions in programs by replacing the breakpoint instruction with an invalid instruction, which when executed on the processor halts execution of the program 150 and causes the processor to send a system exception or interrupt to the breakpoint trap handler 464.

After the user requests that breakpoints and/or address watches be set, the user provides an input to the debug user interface 454 that requests that execution of the program 150 be resumed. Execution of the program 150 eventually results in an encounter of a breakpoint or a modification of the contents at a storage location that has an address watch established, which causes a system exception or interrupt. The breakpoint trap handler 464 receives the exception or interrupt and passes information regarding the exception or interrupt to the debug hook 466.

Then, the debug user interface 454 utilizes the debug hook 466 in order to obtain debugger commands. The debug hook 466 is illustrated for instances where an interface is required between the debug user interface 454 and the breakpoint trap handler 464. In an embodiment, the debug hook 466 may utilize an unillustrated result buffer to cache data for the debug user interface 454.

In response to a command entered via the debug user interface 454 that requests resumption of execution of the program following execution of the program encountering a breakpoint instruction, the interpreter 460 replaces the invalid instruction at the breakpoint location with the original, valid instruction of the program 150 and restarts the program 150 executing on the processor 101.

Figure 5:
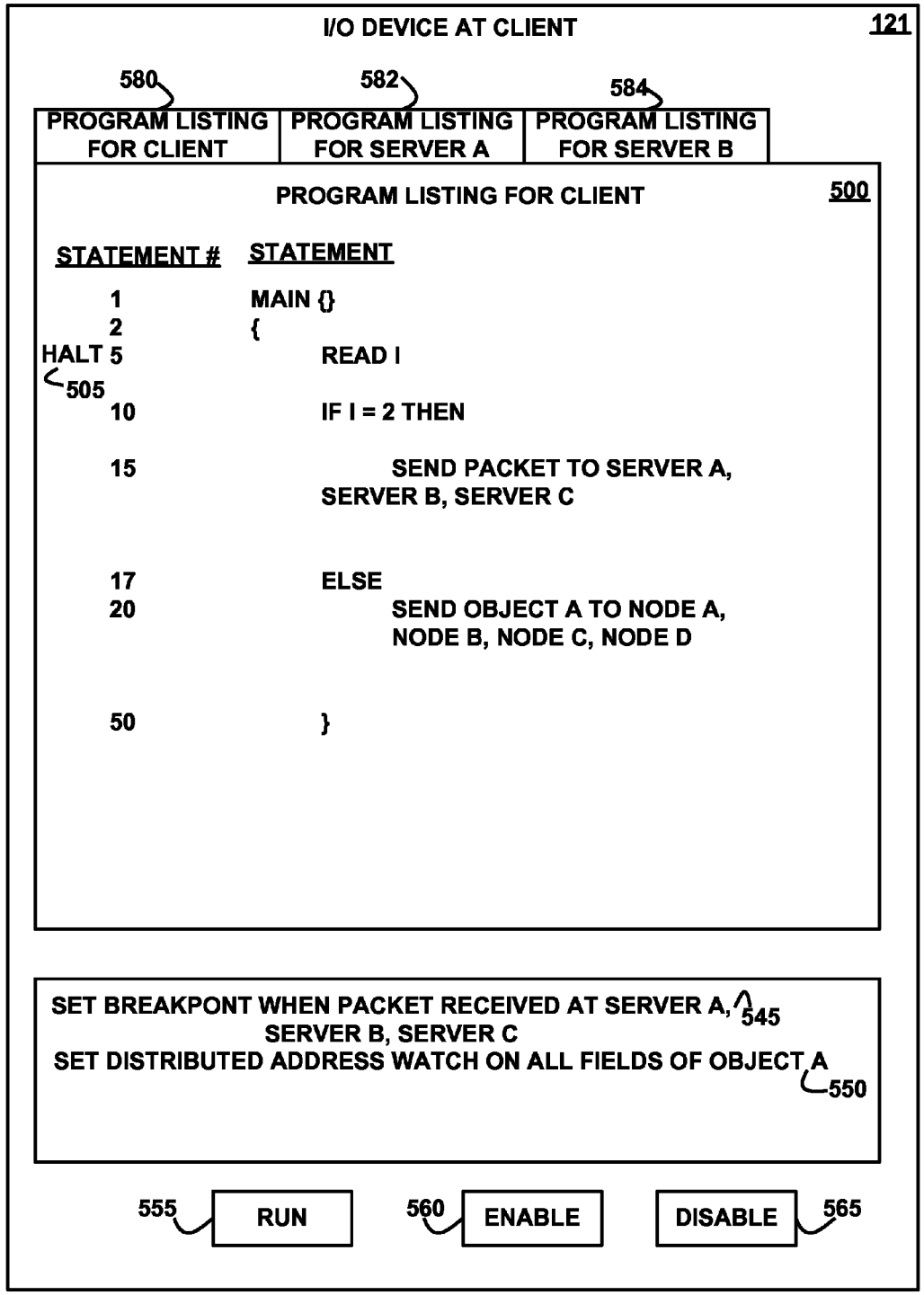
FIG. 5 depicts a block diagram of an example debug user interface, according to an embodiment of the invention.

FIG. 5 depicts a block diagram of an example debug user interface displayed on a user I/O device 121, according to an embodiment of the invention. The example debug user interface is displayed via the user I/O device 121 at the client 100-5 (FIG. 2) or 100-10 (FIG. 3).

The example debug user interface includes a program listing 500, program listing commands 580, 582, and 584, a set breakpoint command 545, a set distributed address watch command 550, a run command 555, an enable debug command 560, and a disable debug command 565. Although the various commands 580, 582, 584, 555, 560, and 565 are illustrated as buttons displayed on a display device, which are selected via an input device, such as a mouse, touch pad, trackpad, pointing device, or keyboard, in other embodiments the commands may be implemented as dials, sliders, widgets, menu options, line commands, commands entered via a microphone and speech recognition commands, or any other appropriate type of user input. Although the commands 545 and 550 are illustrated as line commands, in other embodiments the commands 545 and 550 may be implemented as buttons, dials, sliders, widgets, menu options, commands entered via a microphone and speech recognition commands, or any other appropriate type of user input.

The program listing 500 displays a listing of the source and/or object code statements or instructions within the program 150-1, 150-2, 150-3, 150-4, 150-5, 150-6, 150-7, 150-8, 150-9, or 150-10. If execution of the program is halted, the program listing further comprises an indication 505 of the statement or instruction number at which execution of the program is halted.

The program listing commands 580, 582, and 584 request that the debug agent 156 change the program listing 500 between the programs 150-1, 150-2, 150-3, 150-4, 150-5, 150-6, 150-7, 150-8, 150-9, or 150-10. In response to the program listing commands 500, 582, and 584, the debug agent 156 displays the program listing for the selected program, including an indication of the statement or instruction number, if any, at which execution of the program is halted at the computer on which the displayed program executes. The computer system node on which the displayed program executes may be the same or different from the client at which the program listing is displayed.

The breakpoint command 545 requests that the debug agent 156 set a breakpoint at location within a program at a computer system node. The computer system node at which the breakpoint is requested to be set may be the same or different than the client at which the breakpoint command 545 is issued. The command may specify the location by a statement or instruction number or by a function, module, method or procedure.

The set distributed address watch command 550 requests that the debug agent 156 establish a watch on a memory address at a computer system node or at all computer system nodes where the object is stored or will be stored in the future. The computer system node at which the address watch is requested to be set may be the same or different than the client at which the address watch command 550 is issued. The distributed address watch command may specify the address by an object name, pointer name, variable name, field name, or file name. In response to the distributed address watch command 550, the debug agent 156 sets an address watch function in the processor at a specified computer system node or at all computer system nodes, which causes the processor to raise an interrupt or system exception when the processor modifies the contents of memory at an address that the debug agent 156 specifies. In response to the program modifying the contents of the storage location specified by the address watch, the debug agent 156 stops the program at the instruction that is modifying the storage. Thus, an address watch breakpoint instruction is a load or store instruction accessing a location within a memory page being monitored as an address watch breakpoint.

The run command 555 requests that execution be resumed for the halted program that is displayed by the program listing 500, regardless of at which computer system node the program executes. In response to the run command, the debug agent 156 restarts execution of the halted program. The debug user interface may include other debug commands, such as a step command, which requests that the halted program execute for one instruction or for any specified number of instructions.

The enable debug command 560 requests that debug processing be enabled. In response to the enable debug command 560, the debug agent 156 enables the instrumentation code within the network resources 154. The instrumentation code calls the debug agent 156 in response to execution of a request to send or receive a packet or object 152 to/from a computer system node.

The disable debug command 565 requests that debug processing be turned off or halted. In response to the disable debug command 565, the debug agent 156 disables the instrumentation code within the network resources 154, so that the instrumentation code no longer calls the debug agent 156 in response to execution of a request to send or receive a packet or object 152 to/from a computer system node.

Figure 6:
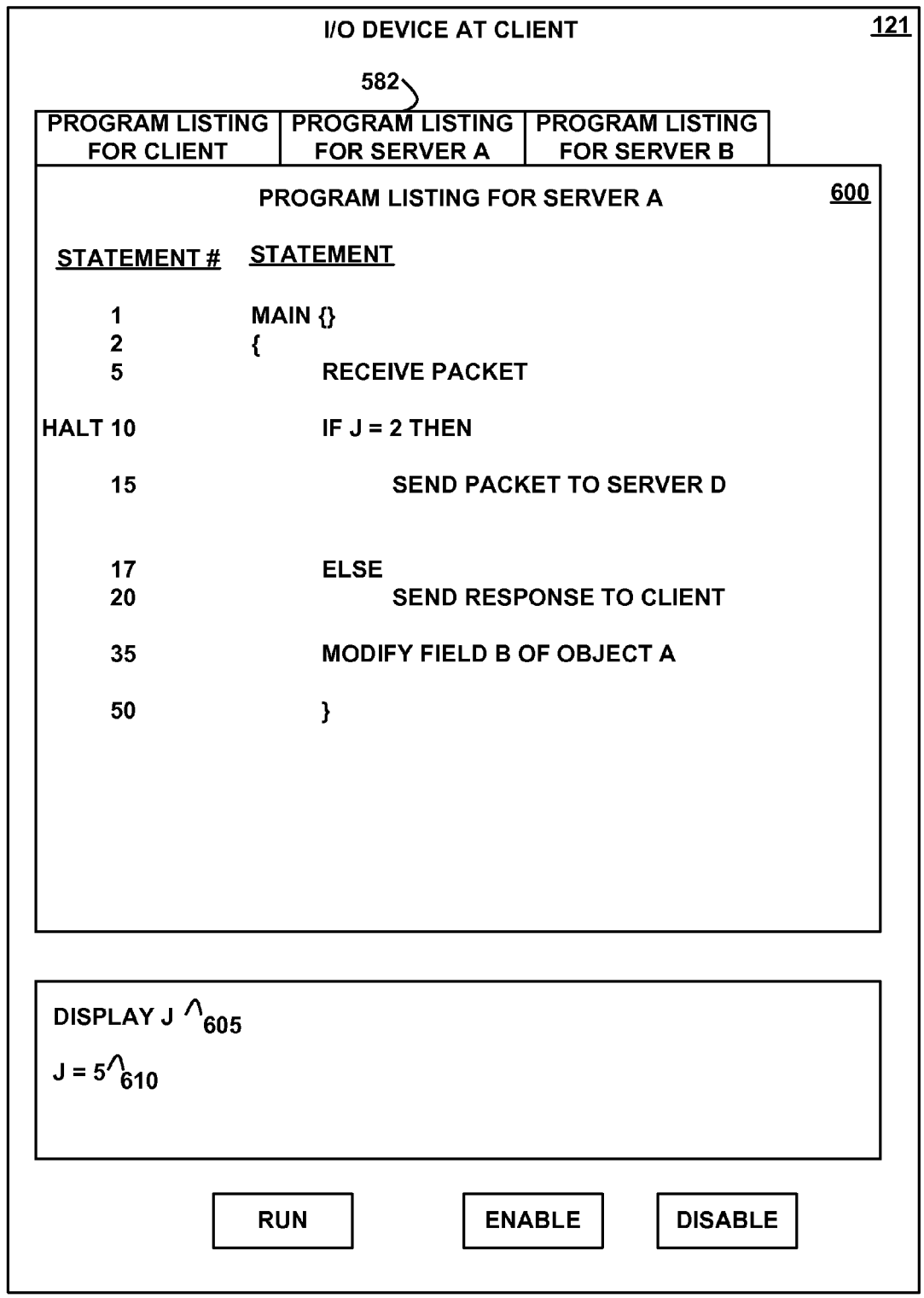
FIG. 6 depicts a block diagram of another example debug user interface, according to an embodiment of the invention.

FIG. 6 depicts a block diagram of an example debug user interface displayed on an I/O device 121, according to an embodiment of the invention. The example debug user interface illustrated in FIG. 6 is displayed via the user I/O device 121 at the client 100-5 (FIG. 2) or 100-10 (FIG. 3).

The example debug user interface of FIG. 6 includes a program listing 600, a display state command 605 and a display of the state 610 of the server program 150-1 (FIG. 2) represented by the program listing 600. The program listing 600 displays a listing of the source and/or object code statements or instructions within the server program 150-1 (FIG. 2) that executes at the server computer system node A 100-1, which is a different computer system node than the client computer system node 100-5, at which the program listing 600 is displayed. The debug agent 156-5 at the client computer system node 100-5 displays the program listing 600 in response to the program listing command 582.

In the example of FIG. 6, the state 610 is the contents of a memory location at the server computer system node A 100-1 that is named as the variable "J," which is read or written by the program 150-1 executing at the server computer system node A 100-1. In other embodiments, the state 610 may be the contents of any variable, parameter, memory location, pointer, data structure, file, register, database field or record that is read or written by a program that executes at any server computer system node or grid computer system node. In an embodiment, the state 610 may include an identifier of the statement or instruction that encountered the breakpoint or that modified the contents at the address monitored by the address watch and an identifier of a thread of the program that encountered the breakpoint or that modified the contents at the address monitored by the address watch. A thread of execution of a program results from a fork of the program into two or more concurrently running tasks or threads. In an embodiment, the multiple threads share resources such as memory, but in another embodiment, the threads do not share memory. In an embodiment, the multiple threads may execute simultaneously or concurrently on different processors. In another embodiment, the multiple threads execute on a single processor via time-division multiplexing or multitasking, where the single processor switches between different threads via context switches that happen frequently enough so that a user perceives the threads as executing simultaneously.

In other embodiments, the state 610 may be a call stack, execution stack, run-time stack, function stack, or invocation stack of the program whose listing is displayed in the program listing 600. A call stack stores information about the active methods, procedures, or subroutines of an executing program, including some or all of the return address of a subroutine (the location of the instruction to return to after the subroutine ends), the values of local variables read or written by the subroutine, parameters passed to the subroutine, an evaluation stack of operands for arithmetic or logical operations, a pointer to the current instance of the subroutine, the enclosing subroutine context, and/or the privilege or authority level of the subroutine.

FIG. 7 depicts a block diagram of example saved debug data 158, according to an embodiment of the invention. The saved debug data 158 is an example of, and generically refers to, the saved debug data 158-1, 158-2, 158-3, 158-4, 158-5, 158-6, 158-7, 158-8, 158-9, and 158-10. In various embodiments and at various times, each of the saved debug data 158-1, 158-2, 158-3, 158-4, 158-5, 158-6, 158-7, 158-8, 158-9, and 158-10 may comprise different data or some or all may comprise identical or partially identical data.

The example saved debug data 158 comprises example rows 702 and 704, each of which comprises a debug command field 710, a client computer system debug agent identifier field 712, and a processing computer system node identifier field 714. The debug command field 710 stores a debug command that the client debug agent identified by the client computer system debug agent identifier field 712 in the same row received from a user interface. In an embodiment, the client computer system debug agent identifier 712 identifies both the debug agent 156 and the client computer system node or network address of the client computer system node on which the client debug agent executes.

The processing computer system node identifier field 714 stores an identifier of the computer system node where the user via the user interface requested that that debug command in the same row be processed, executed, or performed. For example, the row 702 indicates that the debug command 710 of "set breakpoint when packet received," which was received from a user interface at the client computer system node 712 "Node E" requests that a breakpoint be set at the statement in the processing computer system nodes 714 of "Node A, Node B, and Node C" that receives a packet. As another example, the row 704 indicates that the debug command 710 of "set distributed address watch on all fields of object A," which was received from a user interface at the client computer system node 712 "Node E" requests that an address watch function be established at all computer system nodes.

Figure 8:
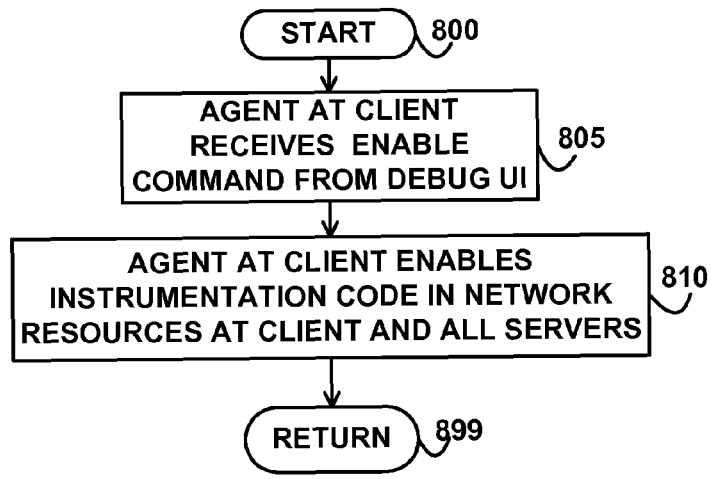
FIG. 8 depicts a flowchart of example processing for an enable debug command, according to an embodiment of the invention.

FIG. 8 depicts a flowchart of example processing for an enable debug command, according to an embodiment of the invention. Control begins at block 800.

Control then continues to block 805 where the debug agent 156 at the client receives an enable debug command 560 from the debug user interface. In response to the enable debug command 560, control then continues to block 810 where the debug agent 156 at the client computer system node enables, turns on, or adds instrumentation code in the network resources 154 or the object request broker at the client computer system node and all of the server computer system nodes or grid computer system nodes. In an embodiment, the debug agent 156 sends a request to all of the server computer system nodes or grid computer system nodes instructing them to add, turn on, or enable instrumentation code in their respective network resources 154 or object request brokers. The debug agents 156 at the server computer system nodes or grid computer system nodes receive the request and, in response, add, turn on, or enable instrumentation code in their respective network resources 154 or object request brokers. Control then continues to block 899 where the logic of FIG. 8 returns.

Figure 9:
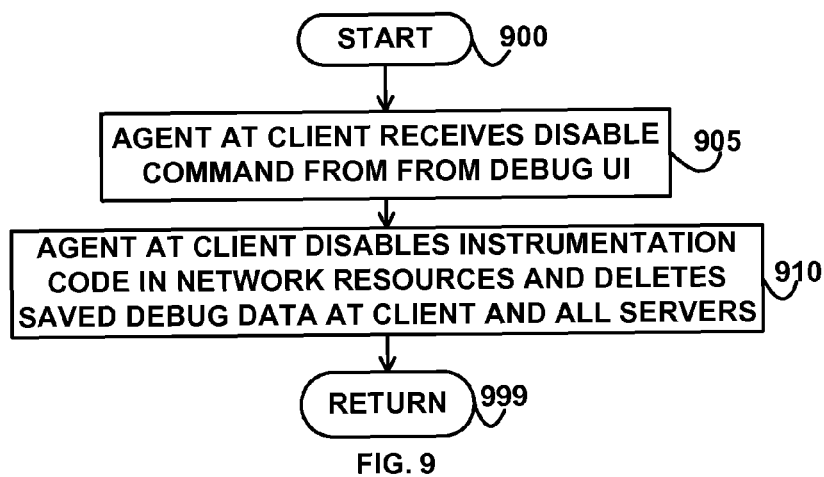
FIG. 9 depicts a flowchart of example processing for a disable debug command, according to an embodiment of the invention.

FIG. 9 depicts a flowchart of example processing for a disable debug command, according to an embodiment of the invention. Control begins at block 900. Control then continues to block 905 where the debug agent 156 at the client computer system node receives a disable debug command 565 from the debug user interface. In response to the disable debug command, control then continues to block 910 where the debug agent 156 at the client computer system node disables, turns off, or removes the instrumentation code in the network resources 154 or the object request broker at the client computer system node and all of the server computer system nodes or grid computer system nodes. In an embodiment, the debug agent 156 sends a request to all of the server computer system nodes or grid computer system nodes instructing them to remove, turn off, or disable the instrumentation code in their respective network resources 154 or object request brokers. The debug agents 156 at the server computer system nodes or grid computer system nodes receive the request and, in response, remove, turn off, or disable the instrumentation code in their respective network resources 154 or object request brokers. Control then continues to block 999 where the logic of FIG. 9 returns.

Figure 10:
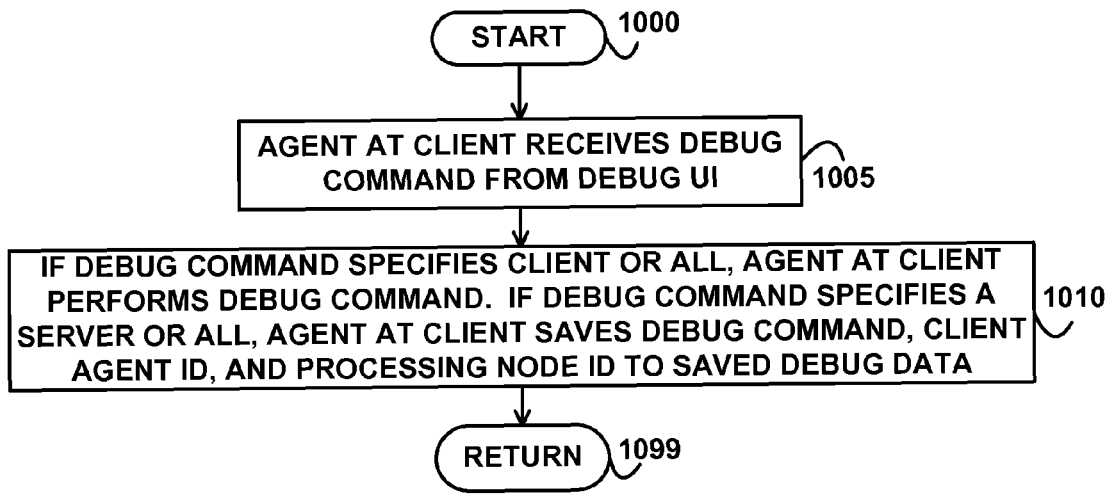
FIG. 10 depicts a flowchart of example processing for breakpoint and distributed address watch commands, according to an embodiment of the invention.

FIG. 10 depicts a flowchart of example processing for breakpoint and distributed address watch commands, according to an embodiment of the invention. Control begins at block 1000. Control then continues to block 1005 where the debug agent 156 at the client receives a debug command, such as a set breakpoint command 545, a set distributed address watch command 550, a run command 555, or any other appropriate debug command from the debug user interface.

In response to the receipt of the debug command, control then continues to block 1010 where, if the debug command specifies that the debug command is to be performed at the client or if the debug command specifies that the debug command is to be performed at all computer system nodes, then the debug agent 156 performs or executes the debug command, such as setting a breakpoint in a program that executes at the client computer system node, setting an address watch on an object stored at the client computer system node, starting a program executing at the client computer system node, or stepping execution of a program at the client computer system node by one instruction or statement or a specified number of instructions or statements.

If the debug command specifies a server/grid node that is different from the client computer system node, or if the debug command specifies all nodes, then the debug agent 156 at the client computer system node saves the received debug command (set breakpoint command, set distributed address watch command, run command, or step command), an identifier of the client debug agent 156, and the identifier of the processing node (a specified server or grid computer system node or nodes or all nodes at which the debug command is to be performed) to the saved debug data 158 in the memory of the client computer system node.

Control then continues to block 1099 where the logic of FIG. 10 returns.

Figure 11:
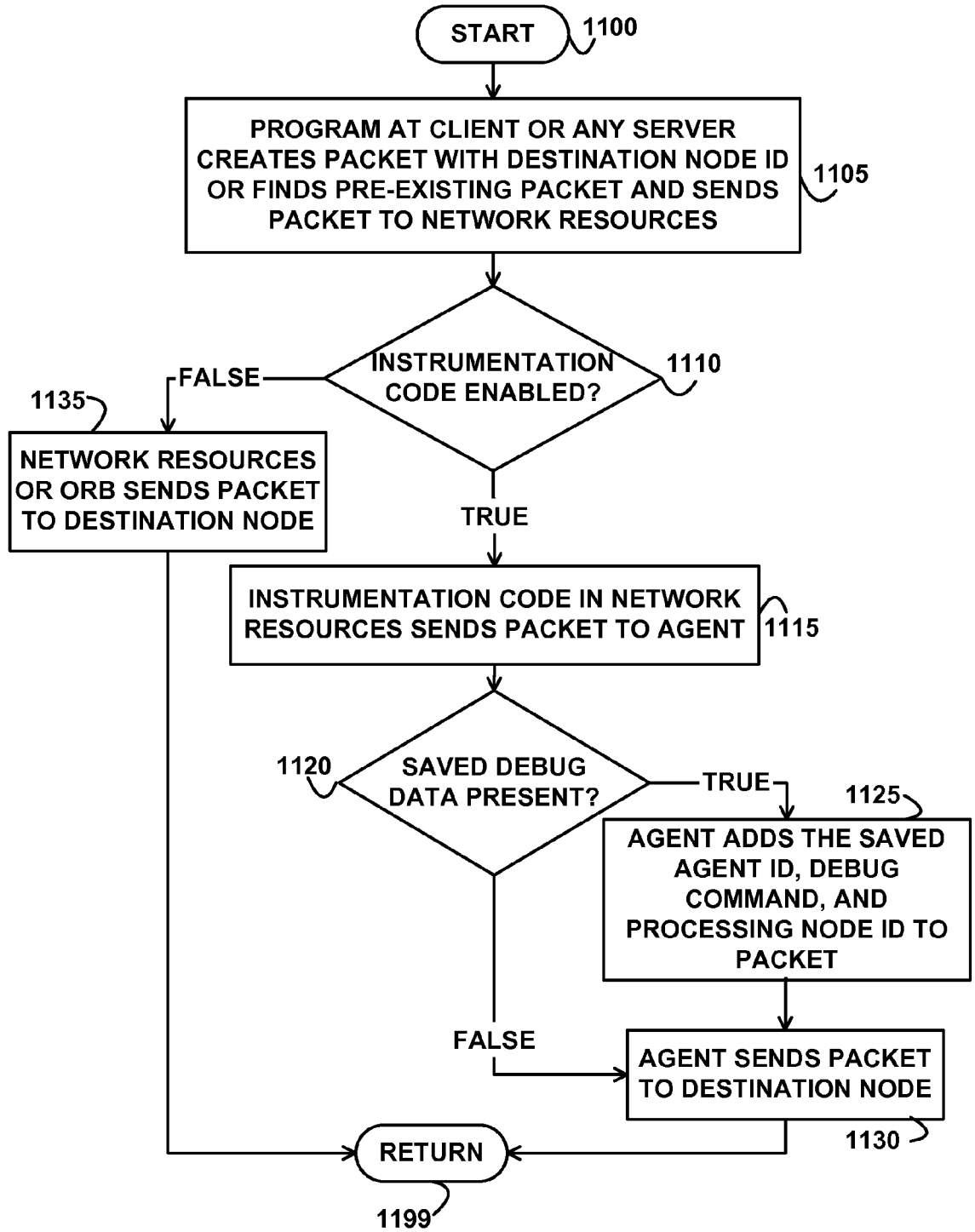
FIG. 11 depicts a flowchart of example processing for sending a packet of data, according to an embodiment of the invention.

FIG. 11 depicts a flowchart of example processing for sending a packet of data, according to an embodiment of the invention. Control begins at block 1100.

Control then continues to block 1105 where the program at the client computer system node or any server computer system node or grid computer system node creates a packet 152 of data, creates an object, or finds a pre-existing packet/object that was previously received from another computer system node (as further described below with reference to FIG. 12, block 1240) and sends the packet 152 or object to the network resources 154 or the object request broker. The packet specifies a destination computer node identifier that identifies the destination computer node for the packet. The destination computer identified by the destination node identifier comprises a program that executes at that destination computer and that is intended to receive and process the packet. Control then continues to block 1110 where the network resources 154 or the object request broker determines whether its instrumentation code is enabled or present.

If the determination at block 1110 is true, then the instrumentation code is enabled or present, so control continues to block 1115 where the instrumentation code in the network resources 154 or the object request broker sends the packet 152 or object to the debug agent 156 (at the same computer node as the network resources 154) instead of sending the packet 152 or object to the destination computer system node (identified by the destination computer node identifier) via the network. Control then continues to block 1120 where the debug agent 156 receives the packet 152 or object and, in response, determines whether any saved debug data 158 is present at the computer system node of the debug agent 156.

If the determination at block 1120 is true, then the saved debug data 158 is present at the computer system node of the debug agent 156, so control continues to block 1125 where the debug agent 156 adds the saved identifier of the client debug agent 712, the saved identifier 714 of the processing node or nodes or an indication of all nodes for the debug command, and the saved debug command 710 from the saved debug data 158, for all rows in the saved debug data 158, to the packet 152 or object. In an embodiment, the processing node identifier is identical to the destination node identifier that identifies the computer node to which the packet is sent. In another embodiment, the processing node identifier is different than the destination node identifier. The processing node identifier and the destination node identifier may be different in embodiments where the packet or object is sent between multiple nodes.

For example, in FIG. 2, the user at the client computer system node 100-5 may desire to set a breakpoint or address watch at one or more of the servers 100-1, 100-2, or 100-3, but not on the load balancer server node 100-4, yet packets from the client computer system node 100-5 are first sent to the load balancer server node 100-4, which sends packets to the other nodes. Thus, the program 150-5 at the client computer system node 100-5 sets the destination node identifier in the packet to indicate the load balancer server node 100-4 since that is the destination node to which the client computer system node 100-5 sends the packet, but the debug agent 156-5 sets the processing node identifier 714 to indicate server 100-1, 100-2, and/or 100-3, where the user desires the breakpoint or address watch to be set.

As another example, in FIG. 3, the user at the client grid node 100-10 may desire to set a breakpoint or address watch at the grid node 100-7, but the grid program 150-10 sends an object to the grid node 100-9. The grid node 100-9 subsequently sends to the object to the grid node 100-6, which sends the object to the grid node 100-8, which ultimately sends the object to the grid node 100-7. Thus, the debug agent 156-10 at the client grid node 100-10 sets the processing node identifier 714 to indicate the grid node 100-7, but the grid program 150-10 sets the destination node identifier in the object to indicate the grid node 100-9.

The saved identifier 712 of the client debug agent identifies the client debug agent at the client computer system node that initially requested the saved debug command 710, which may be different, but is not necessarily different, from the computer system node that is currently executing the logic of FIG. 11. The debug agent 156 performs the processing of block 1125 for all records (all saved debug commands) in the saved debug data 158.

Control then continues to block 1130 where the debug agent 156 sends the packet 152 or object with the identifier(s) of the client debug agent(s) 156, the debug command(s), and the processing node identifier(s) for the debug commands to the destination server computer system node or destination grid computer system node of the packet/object. Control then continues to block 1199 where the logic of FIG. 11 returns.

If the determination at block 1120 is false, then a saved debug command is not present in the saved debug data at the computer system node, so control continues to block 1130 where the debug agent 156 sends the packet 152 or object to the destination computer system node without adding a saved debug command, a saved processing node identifier, or a saved client debug agent identifier to the packet 152 or object. Control then continues to block 1199 where the logic of FIG. 11 returns.

If the determination at block 1110 is false, then the instrumentation code in the network resources 154 or object request broker is not present or is not enabled, so control continues to block 1135 where the network resources 154 or object request broker sends the packet 152 or object to the destination computer system node without sending the packet/object to the debug agent and without adding a saved debug command, a saved processing node identifier, or identifier of a client debug agent to the packet 152 or object. Control then continues to block 1199 where the logic of FIG. 11 returns.

Figure 12:
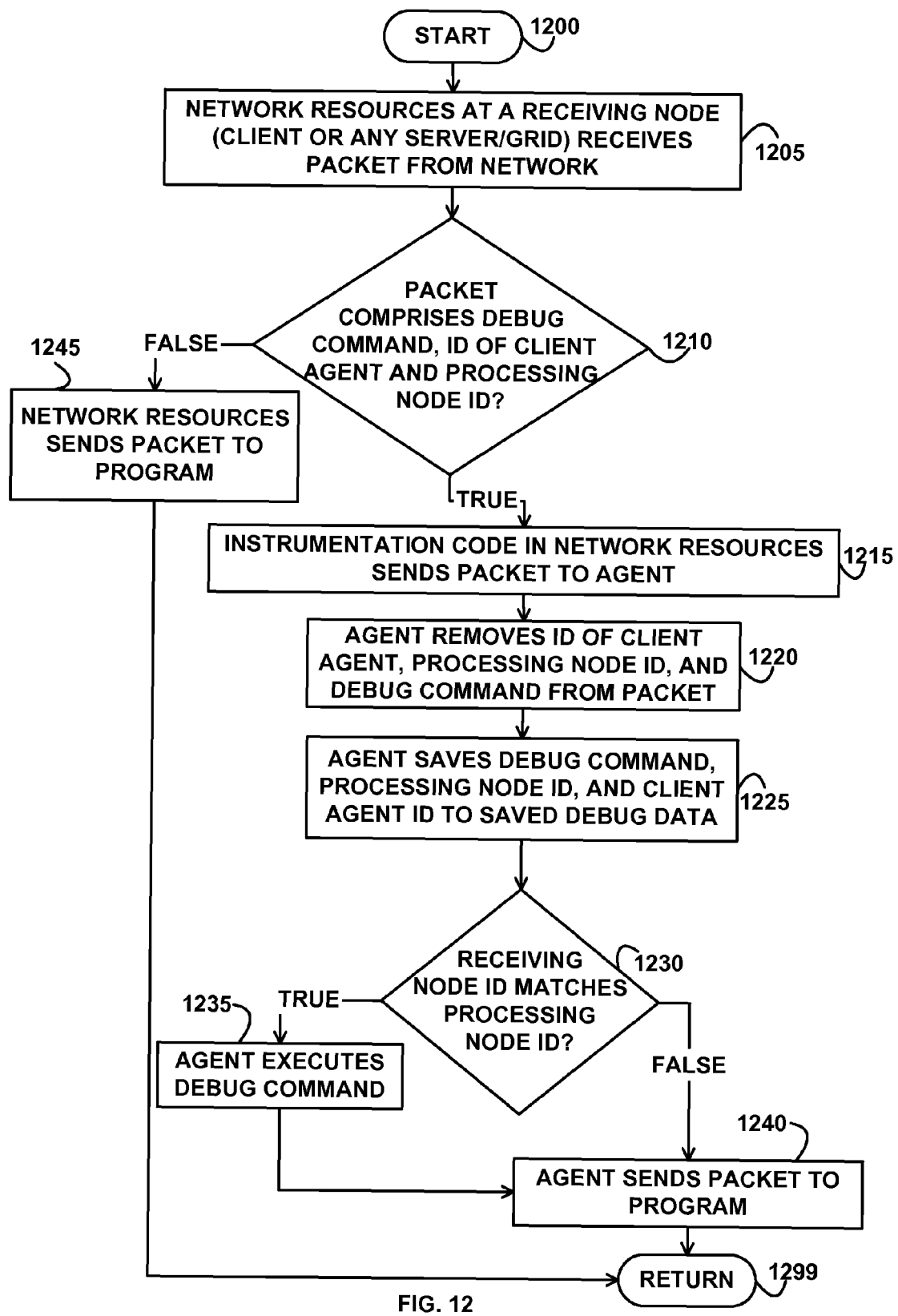
FIG. 12 depicts a flowchart of example processing for receiving a packet of data, according to an embodiment of the invention.

FIG. 12 depicts a flowchart of example processing for receiving a packet of data or object from the network, according to an embodiment of the invention. Control begins at block 1200.

Control then continues to block 1205 where the network resources 154 or object request broker at a receiving computer node (at any client computer system node or at any server/grid computer system node) receives a packet 152 or object from an origin computer system node via the network 130.

Control then continues to block 1210 where the network resources 154 or object request broker determines whether the received packet 152 or object comprises a debug command (e.g., a set breakpoint command, set address watch command, a run command, or a step command), an identifier of a client debug agent 156 that initiated the debug command, and an identifier of a processing node where the debug command is to be performed.

If the determination at block 1210 is true, then the received packet 152 or object comprises a debug command, an identifier of a client debug agent 156, and a processing node identifier, so control continues to block 1215 where the instrumentation code in the network resources 154 or object request broker sends the received packet 152 or object to the debug agent 156 at the local computer system node where the instrumentation code and debug agent execute instead of sending the packet/object to the grid/server program at the local computer system node.

Control then continues to block 1220 where the debug agent 156 receives the packet/object 152 and removes the debug command, the identifier of the client debug agent 156, and the processing node identifier from the packet/object 152. Control then continues to block 1225 where the debug agent 156 saves the removed debug command, the removed processing node identifier, and the removed identifier of the client debug agent to the saved debug data 158.

Control then continues to block 1230 where the debug agent 156 determines whether the receiving computer node identifier of the receiving computer node (the node where the network resources and the debug agent execute) matches (is identical to, is included or encompassed by, or is one of) the processing node identifier in the packet 152 or object. If the determination at block 1230 is true, then the receiving computer node identifier matches the processing node identifier, so control continues to block 1235 where the debug agent 156 executes or performs the removed and saved debug command. For example, the debug agent 156 sets the breakpoint in the local program, establishes the address watch on a memory location in the receiving computer node, or causes the local program at the receiving computer node to start executing or step execute for a specified number of instructions or statements. Control then continues to block 1240 where the debug agent 156 sends the packet 152 or object to the local program at the receiving computer system node of the debug agent 156 without the removed debug command, the removed processing node identifier, and the removed client agent identifier. The local program executes at the same receiving computer node and receives and processes the packet/object 152, e.g., by reading or writing data or performing a request or command indicated by the packet/object 152. The processing of the program may include requesting that the packet/object 152 be sent to another computer system node, which was previously described above with reference to FIG. 11.

Control then continues to block 1299 where the logic of FIG. 12 returns.

If the determination at block 1230 is false, then the receiving computer node identifier of the receiving computer node that received the packet/object does not match the processing node identifier of the debug command in the packet/object, so control continues to block 1240 where the debug agent 156 sends the packet/object 152 to the local program at the receiving computer system node of the debug agent 156 without the removed debug command, the removed processing node identifier, and the client agent identifier, and the debug agent 156 does not execute or perform the removed debug command. The local program executes at the same computer node and receives and processes the packet 152 or object, e.g., by reading or writing data or performing a request or command indicated by the packet 152 or object. The processing of the program may include requesting that the packet/object 152 be sent to another computer system node, which was previously described above with reference to FIG. 11. Control then continues to block 1299 where the logic of FIG. 12 returns.

If the determination at block 1210 is false, then the received packet/object 152 does not comprise a debug command, a processing node identifier, and an identifier of a client debug agent 156, so control continues to block 1245 where the network resources 154 or object request broker sends the packet/object 152 to the local program at the same computer node (the receiving computer node) without sending the packet 152 or object to the debug agent 156. The local program executes at the same computer node and receives and processes the packet 152 or object, e.g., by reading or writing data or performing a request or command, as indicated by the packet 152 or object. The processing of the program may include requesting that the packet/object 152 be sent to another computer system node, which was previously described above with reference to FIG. 11.

Control then continues to block 1299 where the logic of FIG. 12 returns.

Figure 13:
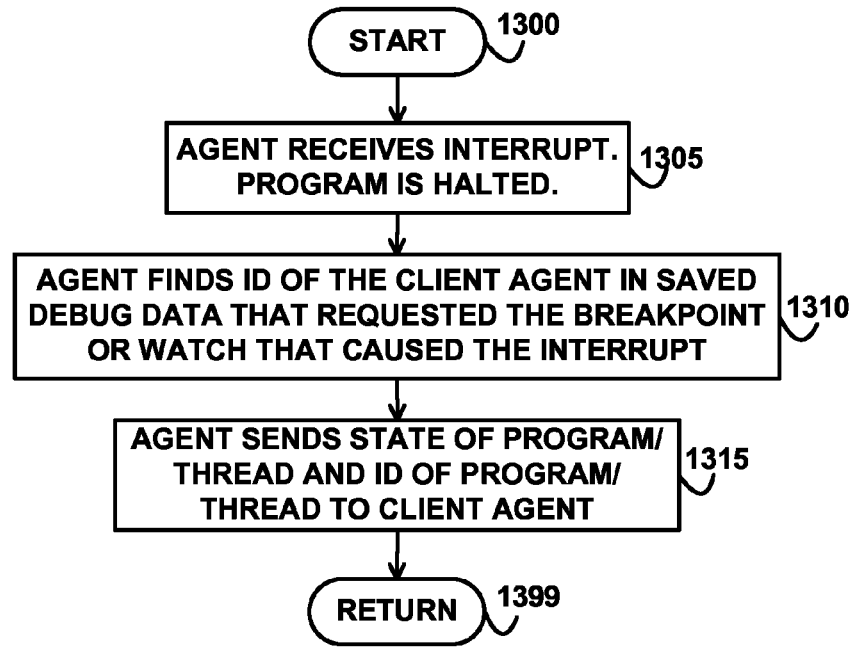
FIG. 13 depicts a flowchart of example processing for processing an interrupt, according to an embodiment of the invention.

FIG. 13 depicts a flowchart of example processing for processing a breakpoint or address watch interrupt, according to an embodiment of the invention. Control begins at block 1300.

Control then continues to block 1305 where the debug agent 156 at any computer system node receives an interrupt or system exception, and the execution of the program or one particular thread of the program at that computer system node is halted at an instruction. The interrupt or system exception indicates that the execution of the instruction in the program or thread of the program encountered or attempted to execute an instruction at which a breakpoint is set or the memory contents at the address being monitored by the address watch function was modified by the instruction of the executing program or thread.

In an embodiment, the program encountered the breakpoint or modified the contents at the address monitored by the address watch while processing, executing, performing, handling, or responding to the packet or object to which a debug command was added that caused that breakpoint or address watch function to be set or initialized. In another embodiment, the instruction in the program encountered the breakpoint or modified the contents at the address monitored by the address watch processing while processing, executing, performing, handling, or responding to the packet or object to which no debug command was added or while performing processing unrelated to any packet received by the program. In another embodiment, the instruction in the program encountered the breakpoint or modified the contents at the address monitored by the address watch processing while processing, executing, performing, handling, or responding to the packet or object to which a different debug command was added that is unrelated to the breakpoint encountered or monitored address that caused that interrupt.

Control then continues to block 1310 where the debug agent 156 finds, in the saved debug data 158, the saved identifier 712 of the client debug agent 156 that requested the breakpoint or address watch that caused the interrupt or system exception. Control then continues to block 1315 where the debug agent 156 sends the state of halted program and an identifier of the halted program and/or an identifier of the thread of the halted program to the client debug agent 156 that is identified by the saved client debug agent identifier 712. Control then continues to block 1399 where the logic of FIG. 13 returns.

Figure 14:
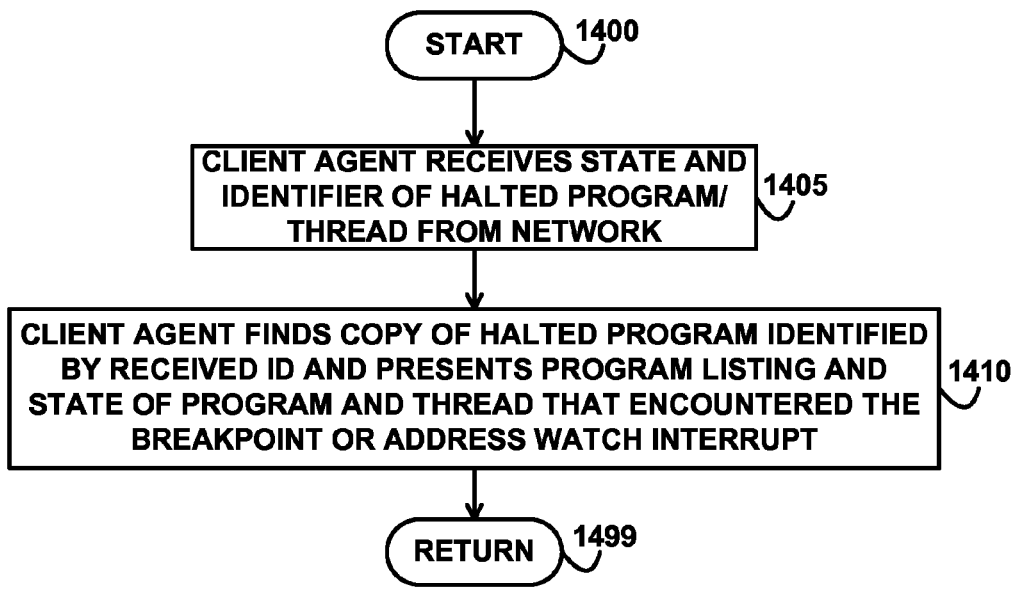
FIG. 14 depicts a flowchart of example processing for processing a state received from a network, according to an embodiment of the invention.

FIG. 14 depicts a flowchart of example processing for receiving a state from a network, according to an embodiment of the invention. Control begins at block 1400.

Control then continues to block 1405 where the client debug agent 156 receives, via the network 130, the state of a program/thread and an identifier of a program/thread that halted execution by encountering a breakpoint or modifying contents of a memory location that was monitored by an address watch on another computer system node that is different from the computer system node on which the client debug agent 156 executes.

Control then continues to block 1410 where the client debug agent 156 finds the copy of the halted program (which, in an embodiment does not execute at the local computer of the client debug agent) that has identifier that matches the received identifier of the halted program, at the local computer on which the client debug agent 156 executes and presents, via the user I/O device 121 (displays via a display device, prints via a printer, or plays via a speaker device), the received state and a copy of the program listing of the program. Control then continues to block 1499 where the logic of FIG. 14 returns.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:

receiving a packet at a first debug agent from a first program at a first computer;

adding a debug command, a processing node identifier, and an identifier of the first debug agent to the packet;

sending the packet that comprises the debug command, the processing node identifier, and the identifier of the first debug agent to a destination computer, wherein a second debug agent at the destination computer removes the debug command, the processing node identifier, and the identifier of the first debug agent from the packet and sends the packet to a second program that executes at the destination computer, wherein the second debug agent executes the debug command if a destination node identifier that identifies the destination computer matches the processing node identifier, wherein the second debug agent does not execute the debug command if the destination node identifier does not match the processing node identifier;

in response to a request from the second program to send the packet to a receiving computer, the second debug agent adds the debug command, the processing node identifier, and the identifier of the first debug agent back to the packet and sends the packet to the receiving computer, wherein a third debug agent at the receiving computer sends the packet to a third program that executes at the receiving computer, wherein the third debug agent executes the debug command if a receiving node identifier that identifies the receiving computer matches the processing node identifier in the packet, wherein the execute of the debug command causes the third program to halt execution, wherein the third debug agent does not execute the debug command if the receiving node identifier that identifies the receiving computer does not match the processing node identifier in the packet;

receiving, at the first debug agent at the first computer, a state of the third program and an identifier of the third program that is halted; and presenting, at the first computer, the state of the third program and a program listing of the third program.

2. The method of claim 1, wherein, in response to receiving the debug processing packet, a second debug agent at the receiving computer sets a breakpoint in the second program, and the second program halts execution at the breakpoint.

3. The method of claim 1, wherein, in response to receiving the debug processing packet, a second debug agent at the receiving computer starts an address watch on a location in memory in the receiving computer, and the second program halts execution in response to modifying content at the location in the memory.

4. The method of claim 3, wherein the second debug agent, in response to modifying content at the location in the memory, uses the debug processing packet to permit debugging according to the state of the second program and the presenting the state of the second program comprises:
   presenting a program listing of the second program; and
   presenting saved debug data.

5. A non-transitory computer-readable storage medium encoded with instructions, wherein the instructions when executed comprise:
   receiving a packet at a first debug agent from a first program at a first computer;
   adding a debug command, a processing node identifier, and an identifier of the first debug agent to the packet;
   sending the packet that comprises the debug command, the processing node identifier, and the identifier of the first debug agent to a destination computer, wherein a second debug agent at the destination computer removes the debug command, the processing node identifier, and the identifier of the first debug agent from the packet and sends the packet to a second program that executes at the destination computer, wherein the second debug agent executes the debug command if a destination node identifier that identifies the destination computer matches the processing node identifier, wherein the second debug agent does not execute the debug command if the destination node identifier does not match the processing node identifier;
   in response to a request from the second program to send the packet to a receiving computer, the second debug agent adds the debug command, the processing node identifier, and the identifier of the first debug agent back to the packet and sends the packet to the receiving computer, wherein a third debug agent at the receiving computer sends the packet to a third program that executes at the receiving computer, wherein the third debug agent executes the debug command if a receiving node identifier that identifies the receiving computer matches the processing node identifier in the packet, wherein the execute of the debug command causes the third program to halt execution, wherein the third debug agent does not execute the debug command if the receiving node identifier that identifies the receiving computer does not match the processing node identifier in the packet;
   receiving, at the first debug agent at the first computer, a state of the third program and an identifier of the third program that is halted; and
   presenting, at the first computer, the state of the third program and a program listing of the third program.

6. The computer-readable storage medium of claim 5, wherein, in response to receiving the debug processing packet, the third debug agent at the receiving computer sets a breakpoint in the third program, and the third program halts execution at the breakpoint.

7. The computer-readable storage medium of claim 5, wherein, in response to receiving the debug processing packet, the third debug agent at the receiving computer starts an address watch on a location in memory in the receiving computer, and the third program halts execution in response to modifying content at the location in the memory.

8. The computer-readable storage medium of claim 5, wherein the third debug agent removes the debug command, the identifier of the first debug agent, and the processing node identifier from the debug processing packet prior to sending the debug processing packet to the third program.

9. The computer-readable storage medium of claim 5, wherein the third program does not execute at the first computer.

10. The computer-readable storage medium of claim 5, wherein in response to an interrupt that indicates the third program is halted, the third debug agent finds the identifier of the first debug agent that requested the debug command that caused the interrupt and sends the state of the third program, the identifier of the third program, and an identifier of a thread of the third program that is halted to the first debug agent.

11. A distributed debug system comprising:
    a first computer comprising a first debug agent, wherein the first debug agent receives a packet and adds, a debug command, a processing node identifier, and an the identifier of the first debug agent to the packet; and
    a destination computer communicatively connected to the first computer, wherein a second debug agent receives the packet and removes the debug command, the processing node identifier, and the identifier of the first debug agent from the packet and sends the packet to a second program that executes at the destination computer, wherein the second debug agent executes the debug command if a destination node identifier that identifies the destination computer matches the processing node identifier, wherein the second debug agent does not execute the debug command if the destination node identifier does not match the processing node identifier;
    a receiving computer communicatively connected to the first computer and the destination computer, the receiving computer receiving the packet in response to a request from the second program to send the packet to the receiving computer, the second debug agent adds the debug command, the processing node identifier, and the identifier of the first debug agent back to the packet and sends the packet to the receiving computer, wherein a third debug agent at the receiving computer sends the packet to a third program that executes at the receiving computer, wherein the third debug agent executes the debug command if a receiving node identifier that identifies the receiving computer matches the processing node identifier in the packet, wherein the execute of the debug command causes the third program to halt execution, wherein the third debug agent does not execute the debug command if the receiving node identifier that identifies the receiving computer does not match the processing node identifier in the packet;
    receiving, at the first debug agent at the first computer, a state of the third program and an identifier of the third program that is halted; and
    presenting, at the first computer, the state of the third program and a program listing of the third program.

12. The distributed debug system of claim 11, wherein, in response to executing the command, the third debug agent sets a breakpoint in the third program, and the third program halts execution at the breakpoint, and
    wherein the distributed debug system includes grid computer system nodes having a plurality of grid programs, a plurality of objects, a plurality of object request brokers, a plurality of debug agents, and saved debug data.

13. The distributed debug system of claim 11, wherein, in response to executing the command, the third debug agent starts a distributed address watch on a location in memory in the receiving computer, and the third program halts execution in response to modifying content at the location in the memory.

14. The distributed debug system of claim 11, wherein the third debug agent deletes the debug command, the identifier of the first debug agent, and the processing node identifier from the debug processing packet prior to sending the debug processing packet to the third program.

15. The distributed debug system of claim 11, wherein in response to an interrupt that indicates the third program is halted, the third debug agent finds, in saved debug data, the identifier of the first debug agent that requested the debug command that caused the interrupt and sends the state of the third program, the identifier of the third program, and an identifier of a thread of the third program that is halted to the first debug agent, and wherein the saved debug data includes a debug command field, a client computer system debug agent identifier field, and a processing computer system node identifier field.

* * * * *